United States Patent
Juda et al.

[19]

[11] Patent Number: 5,904,754
[45] Date of Patent: May 18, 1999

[54] DIFFUSION-BONDED PALLADIUM-COPPER ALLOY FRAMED MEMBRANE FOR PURE HYDROGEN GENERATORS AND THE LIKE AND METHOD OF PREPARING THE SAME

[75] Inventors: Walter Juda, Lexington; Charles W. Krueger, Somerville, both of Mass.; R. Todd Bombard, Pelham, N.H.

[73] Assignee: Walter Juda Associates

[21] Appl. No.: 08/880,990

[22] Filed: Jun. 20, 1997

[51] Int. Cl.⁶ .......................... B01D 53/22; B01D 71/02
[52] U.S. Cl. .......................... 96/11; 55/524; 55/DIG. 5; 95/56
[58] Field of Search .................. 95/55, 56; 96/4, 96/11; 55/524, DIG. 5

[56] References Cited

U.S. PATENT DOCUMENTS

| | | | |
|---|---|---|---|
| 2,958,391 | 2/1960 | deRosset | 96/11 X |
| 4,655,797 | 4/1987 | Iniotakis et al. | 55/524 X |
| 5,139,541 | 8/1992 | Edlund | 55/524 X |
| 5,259,870 | 11/1993 | Edlund | 55/524 X |
| 5,393,325 | 2/1995 | Edlund | 55/524 X |
| 5,614,001 | 3/1997 | Kosaka et al. | 55/524 X |
| 5,703,359 | 12/1997 | Wampler, III | 96/11 X |

FOREIGN PATENT DOCUMENTS

| | | | |
|---|---|---|---|
| 3-242231 | 10/1991 | Japan | 96/4 |
| 1032132 | 6/1966 | United Kingdom | 96/4 |

*Primary Examiner*—Robert Spitzer
*Attorney, Agent, or Firm*—Rines and Rines

[57] ABSTRACT

A hydrogen-selective thin Pd/40% Cu membrane as for use as a wall connecting high and low pressure chambers of a hydrogen generator, comprising the foil having its edge area diffusion-bonded to a copper-surfaced metallic frame; and a method of preparing the same.

7 Claims, 1 Drawing Sheet

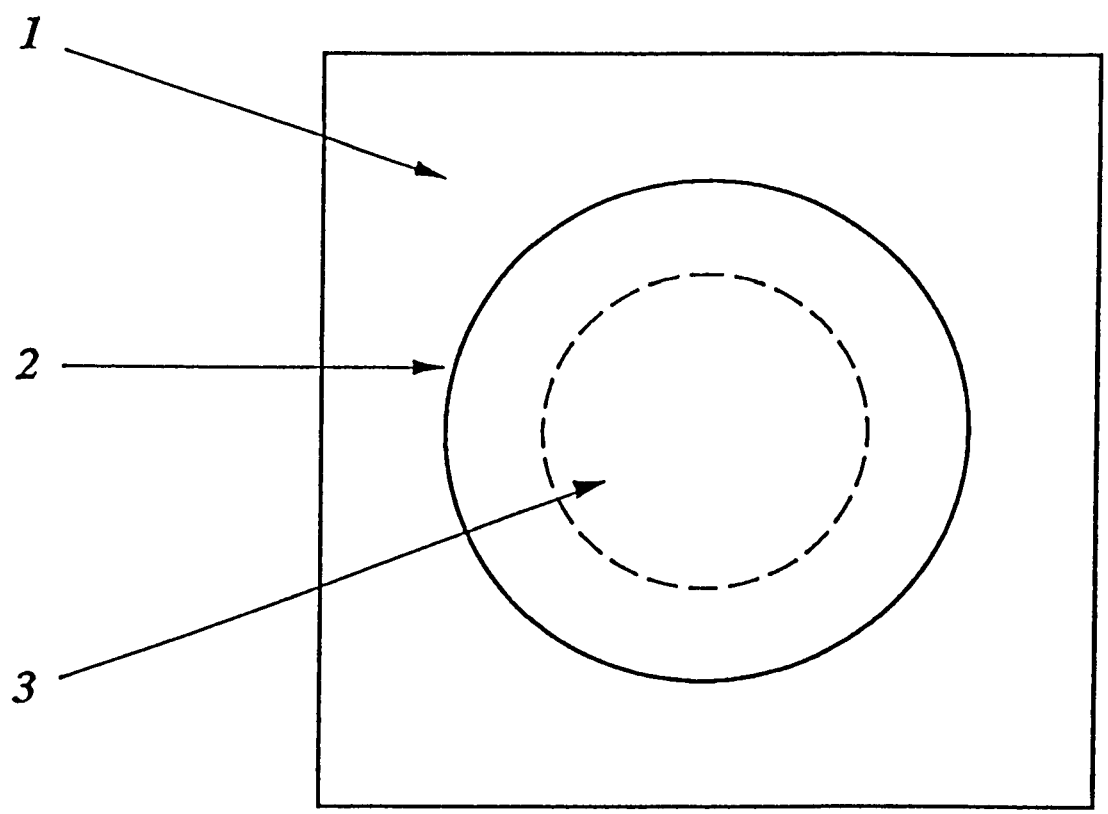

DIFFUSION-BONDED PALLADIUM-COPPER ALLOY FRAMED MEMBRANE FOR PURE HYDROGEN GENERATORS AND THE LIKE AND METHOD OF PREPARING THE SAME

FIELD OF THE INVENTION

This invention relates to hydrogen-selective membrane walls for connecting the high pressure chamber to the low pressure chamber of apparatus for the preparation of pure hydrogen at elevated temperatures.

BACKGROUND OF THE INVENTION

The prior art is replete with descriptions of palladium-bearing alloy membranes used to prepare pure hydrogen from gaseous hydrogen-containing mixtures by permeation through a palladium-bearing metallic membrane under pressure and at elevated temperatures. Reference is made to the co-pending patent application Ser. No. 08/719,385 of common assignee which is incorporated herein by reference. Wherein an important advantage of a 60% palladium-40% copper alloy membrane with respect to temperature-cycling and minimal swelling in hydrogen is disclosed. This bears also on the publication by J. Shu, B. P. Grandjean, A. van Neste and S. Kaliaguine, entitled "Catalytic Palladium-based Membrane Reactors: A Review", The Canadian Journal of Chemical Engineering, Vol. 69, (October, 1991), herein also incorporated by reference, wherein this particular palladium-copper alloy is described as showing a sharp maximum at 40 wt % Cu.

Accordingly, for the purpose of the present invention, we use such palladium copper alloys with copper contents sufficiently near the 40% by weight optimum, (i.e. 36–42% Cu), in which narrow range more than two thirds of the maximum flux is retained. Such alloys are termed "Pd/40% Cu" in this specification and the appended claims.

As shown, for example, in the above referenced co-pending application, Pd alloy membranes can be in the form of thin flat foils or small diameter tubes (e.g. 2 mm O.D.). Foils of the Pd/40% Cu membrane are readily available in thicknesses of 0.001 to 0.0025 inches, whereas special expensive techniques a re required to make such Pd/40% Cu tubes with wall thicknesses of no less than 0.0025 inch.

As also disclosed in the above-referenced co-pending application, a palladium alloy foil can be sandwiched between gaskets, and the edge area of the sandwich can be pressed onto a metallic frame. To so produce a leak-tight two-chamber apparatus, a uniform weighty and costly edge pressure is required to at least balance the pressure in the high pressure chamber. It is thus important to replace, in a pure hydrogen generator, the gasket seal with a pressure-tight seal, such as a weld. Welding is preferred over brazing or soldering to avoid contamination of the foil by the extraneous metals of the latter.

Diffusion welding employs temperatures that range from 50 to 75% of the melting point ["Procedure Development and Practice Considerations for Diffusion Welding", by S. B. Dunkerton, "ASM Handbook", vol. 6, p. 883, ASM International (1993)]. Diffusion welding of copper to a different metal or to an alloy "is conducted at a temperature greater than one-half of the absolute melting point" [Diffusion welding of Solid-State Welding, by J. L. Jellison and F. J. Zanner, "Metals Handbook", 9th Ed. Vol. 6, p. 672, ASM International (1983); see first column on page 672 and Table 1 on page 677].

The Pd/40% Cu alloy has a melting point of approximately 1200° C. (1473K) ["ASM Handbook", vol. 3, p. 717, ASM International (1993)]. Hence welding it to copper is expected to require a temperature in excess of about 460° C. (733K). However, we have found that the hydrogen flux across the Pd/40% Cu foil deteriorates after the foil has been exposed to such high temperatures.

Underlying the present invention is the discovery that these problems can be overcome by providing a hydrogen selective Pd/40% Cu membrane wall in the form of a thin palladium-copper alloy membrane of carefully controlled composition in an open-area copper-surfaced metallic frame, hermetically bonded by diffusion-bonding the membrane to the frame.

The term "diffusion-bonding", as used herein means controlling and maintaining an elevated bonding temperature below about 350° C., while subjecting the edge area of the membrane in contact with the frame to a substantially uniform high pressure, in an oxygen-free atmosphere.

OBJECTS OF THE INVENTION

One object of this invention is to provide a novel, much lower-temperature, diffusion-bonding technique of Pd/40% Cu to copper which avoids flux deterioration, as well as the need for excessive edge gasket compression.

Another object of this invention is a new and improved pure hydrogen-permeating membrane wall having a Pd/40% Cu foil hermetically bonded by such technique to a copper surface on a temperature and pressure-resistant, herein termed "firm", metallic frame.

Other and further objects will be explained hereinafter and are more fully delineated in the appended claims.

SUMMARY OF THE INVENTION

In summary, from one of it's viewpoints, this invention broadly embraces an assembly comprising a thin Pd/40% Cu foil having its edge area diffusion-bonded to a copper-surfaced metallic frame. The term "copper surface" as used in this specification and in the appended claims means a copper coating as well as a copper-rich alloy coating of sufficient copper content for diffusion-bonding.

The novel diffusion-bonding technique of this invention comprises the step of pressing a thin Pd/40% Cu foil, preferably 0.001–0.0025 inches thick, onto a copper-surfaced frame, after exposure to or, preferably, in a hydrogen-containing atmosphere, in the range of 200° to 350° C. and more particularly between 290° and 325° C., for example, for a cycle period of several hours in a hydrogen atmosphere furnace.

The novel wall of this invention comprises a polished firm metallic frame made of carbon steel or stainless steels or others, an adherent, preferably electroplated, copper surface thereon, and a thin Pd/40% Cu membrane foil having its edge area hermetically sealed to the copper surface by the above novel diffusion-bonding technique.

Preferred and best mode designs and techniques are later presented.

DESCRIPTION OF THE DRAWING

The invention will now be described in connection with the accompanying drawing, the single FIGURE of which is a schematic top view of a metal frame having its open area covered by a Pd/40% Cu foil with the foil edge area diffusion-bonded to the frame, in accordance with the invention.

DESCRIPTION OF PREFERRED EMBODIMENTS

We propose, as above stated, to take advantage of the availability and of the low cost (relative to tubes) of a thin Pd/40% Cu foil membrane by diffusion-bonding it hermetically to a frame to form a wall which, in a pure hydrogen generator, obviates gasketing and the excessive mechanical pressure required therefore.

Surprisingly, we have found that a Pd/40% Cu foil can be diffusion-bonded to copper under pressure and, after exposure to and, preferably in the presence of hydrogen, even when the temperature is in the low range of 200° to 350° C., and preferably between 290° and 325° C. While we do not wish to be held to any theory, it is believable that the bond results, at least in part, from copper inter-metallic diffusion and that the hydrogen exposure eliminates any interfering oxide layer.

This mode of diffusion-bonding has been found not to be deleterious to the membrane, as evidenced by its durability, at the very same temperatures, when pure hydrogen is generated from a methanol-steam reformate, as described in the above-referred to co-pending patent application.

By way of example, referring now to the FIGURE of the drawing, samples of Alloy 101 (i.e. oxygen-free) copper frames 1, each 1.5 inches square and 0.03125 inch thick, were center punched each with a 0.625 inch diameter hole. Pd/40% Cu foils 3, each 0.001 inch thick and 1 inch diameter, were centered over the 0.625 inch diameter holes of the frames 1. The 0.1875 inch overlap edge perimeters 2 of each of the foils 3 were mechanically held under pressure by a pair of opposing flanges (not shown). The pressure was controlled by the torque load on the four flange bolts (also not shown).

After evenly tightening the flange bolts, the assemblies were loaded into a controlled atmosphere furnace for heat-treating. The furnace temperatures were varied between 200° and 350° C. with a slow flow of pure hydrogen gas through the furnace, which was held at atmospheric pressure, or alternatively under reduced pressure, for about twelve hours.

The hermetic seals between the foils and the frames produced by the diffusion bonds were tested by subjecting the finished assemblies in a separate apparatus (also not shown) to a pressure gradient of helium gas of up to 150 psi for several hours. No gas leakage was observed.

When selecting a temperature range between 290° and 325° C. and flowing hydrogen at about atmospheric or reduced pressure, a mechanical perimeter pressure in the order of 5000 psi or more resulted in producing hermetic seals between the frame and foil.

Bonding periods in the furnace vary with operating conditions. The required times for hermetic sealing are readily determined experimentally by selecting and controlling the temperature, edge pressure and either the pre-hydrogen exposure at an elevated temperature and/or the hydrogen atmosphere in the furnace, and then leak-testing the resultant assembly.

As the wall separating the high and low pressure chambers of a pure hydrogen generator, the diffusion-bonded assemblies of this invention must withstand the pressure differential at the elevated operating temperature. The above-described, 100% copper framed, diffusion-bonded assemblies deformed badly under gas pressure above about 200° C. However, operation of such diffusion bonded assemblies below about 200° C. is undesirable due to poor hydrogen permeability.

Hence, for the purpose of this invention, we use a structurally firm frame made of a metal or an alloy subject to copper coating, which is not weakened under the operating temperatures and pressures of a pure hydrogen generator, such as carbon steel, stainless steels, or others, which, when not subject to copper coating, do not lend themselves to diffusion-bonding.

We have found that diffusion-bonding, as herein described, of a Pd/40% Cu foil to a copper-coating plated onto such a firm metallic frame, results in an assembly, in which, surprisingly, the bond of the copper coating to the frame metal and the bond of the Pd/40% Cu foil to the copper coating, are both strong.

But, in leak tests of these assemblies, helium leaks were sometimes encountered. Though again we do not wish to be held to any theory, we have found it plausible to attribute the helium leaks either to the grainy streaks of the somewhat uneven surface of the metal frame, (which streaks were actually showing through the foil's edge area of the finished assembly) and/or to too thin a copper plate (such as less than 0.0005 inch thick).

Thus, to obtain consistent hermetic seals for the use of the assemblies in two-chamber hydrogen generators, we select thicker copper coatings and/or we polish the frame metal to provide a smooth even area prior to plating copper and diffusion-bonding Pd/40% Cu thereon. These samples were leakproof in the helium leak test.

As a specific example of producing such a leak proof assembly, samples of a commercial grade "oil hardening" pre-ground flat stock carbon steel were prepared in the above-described dimensions. Prior to copper plating, they were polished to a smooth finish, some by hand and others by electropolishing, cleaned by degreasing and pickled. Some samples were also subjected to a short electrolytic "nickel strike" to assure good copper adhesion.

The samples were then electroplated from standard, e.g. cyanide or sulfate, baths to copper coating thicknesses of about 0.0005 to 0.0008 inch.

Diffusion-bonding of 0.001 inch thick Pd/40% Cu foils to the copper plated frames was then performed as above-described.

While preferred embodiments of the invention have been described in the foregoing, it will be apparent to those skilled in the art that they can be varied without departing from the scope of the invention.

We claim:

1. An assembly comprising a thin Pd/40% Cu foil having its edge area diffusion-bonded to a copper-surfaced metallic frame.

2. In a high pressure-low pressure chamber apparatus for the permeation, under a pressure differential, of pure hydrogen across a hydrogen-selective membrane at an elevated temperature, a wall connecting the high-pressure chamber to the low-pressure chamber, said wall comprising a thin Pd/40% Cu foil membrane having its edge area hermetically diffusion-bonded to a copper-surfaced firm metallic frame.

3. The wall of claim 2 wherein said metallic frame is one of polished carbon steel and stainless steel.

4. The wall of claim 2 wherein the copper surfaced frame is polished.

5. The method of producing a Pd/40% Cu foil membrane bonded to a copper-surfaced metallic frame that comprises exposing said frame and membrane to hydrogen, contacting the edge area of said membrane with said copper frame and applying to said edge area, at a controlled elevated temperature between 200° and 350° C., a substantially uniform high pressure, thereby diffusion-bonding said membrane to the copper surface of said frame.

6. The method of claim 5 wherein the hydrogen exposure and pressure application are carried out simultaneously.

7. The method of claim 5 including the prior steps of polishing said frame and plating a copper-coating thereon.

* * * * *